United States Patent
Tseng et al.

(10) Patent No.: US 9,584,032 B2
(45) Date of Patent: Feb. 28, 2017

(54) MULTI-OUTPUT DC-TO-DC POWER CONVERTER

(71) Applicants: LITE-ON ELECTRONICS (GUANGZHOU) LIMITED, Guangzhou (CN); LITE-ON TECHNOLOGY CORP., Taipei (TW)

(72) Inventors: Po-Hsiang Tseng, Taoyuan County (TW); Chih-Tai Chen, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 0 days.

(21) Appl. No.: 14/943,448

(22) Filed: Nov. 17, 2015

(65) Prior Publication Data
US 2017/0033694 A1 Feb. 2, 2017

(30) Foreign Application Priority Data
Jul. 31, 2015 (CN) .......................... 2015 1 0468322

(51) Int. Cl.
H02M 3/335 (2006.01)
(52) U.S. Cl.
CPC .............................. *H02M 3/33507* (2013.01)

(58) Field of Classification Search
CPC ................................................ H02M 3/33507
See application file for complete search history.

(56) References Cited

U.S. PATENT DOCUMENTS

| | | | |
|---|---|---|---|
| 9,000,673 B2* | 4/2015 | Feng ................. | H05B 33/0839 315/186 |
| 2011/0157921 A1* | 6/2011 | Lo ....................... | H02M 1/4208 363/21.04 |
| 2012/0170322 A1* | 7/2012 | Thomas ............ | H02M 3/33569 363/16 |

* cited by examiner

*Primary Examiner* — Emily P Pham
(74) *Attorney, Agent, or Firm* — Rosenberg, Klein & Lee

(57) ABSTRACT

A multi-output DC-to-DC power converter includes: a transformer having a primary winding and a secondary winding unit; a primary side control circuit used to receive a DC input voltage, and configured to control supply of the DC input voltage to said primary winding, said transformer generating an induced voltage when the DC input voltage is supplied to said primary winding; a rectifier and filter circuit used to receive the induced voltage, and configured to rectify and filter the induced voltage so as to output at least a first DC voltage; and a converting unit used to receive the first DC voltage, and configured to generate at least first and second DC output voltages based at least on the first DC voltage.

12 Claims, 13 Drawing Sheets

MULTI-OUTPUT DC-TO-DC POWER CONVERTER

CROSS-REFERENCE TO RELATED APPLICATION

This application claims priority of Chinese Patent Application No. 201510468322.3, filed on Jul. 31, 2015.

FIELD

The disclosure relates to a power converter, and more particularly to a multi-output DC-to-DC power converter.

BACKGROUND

Referring to FIG. 1, a conventional multi-output DC-to-DC power converter 1 is shown to include a transformer (T1), a primary side control circuit 11, first to third rectifier and filter circuits 12, 13, 14, a regulator circuit 15, a feedback circuit 16 and a regulator control circuit 17.

The transformer (T1) has a primary winding ($L_p$) and first to third secondary windings ($L_{s1}$, $L_{s2}$, $L_{s3}$). The primary side control circuit 11 is used to receive a DC input voltage (Vin) from an input power source 10, and is coupled to the primary winding ($L_p$) of the transformer (T1). The primary side control circuit 11 controls supply of the DC input voltage (yin) to the primary winding ($L_p$). When the DC input voltage (Vin) is supplied to the primary winding ($L_p$), the transformer (T1) generates first to third induced voltages respectively across the first to third secondary windings ($L_{s1}$, $L_{s2}$, $L_{s3}$). The first rectifier and filter circuit 12 is coupled to the first secondary winding ($L_{s1}$) of the transformer (T1) for receiving the first induced voltage therefrom, and rectifies and filters the first induced voltage so as to output a first DC output voltage ($V_1$) of 12V to a load (not shown). The second rectifier and filter circuit 13 is coupled to the second secondary winding ($L_{s2}$) of the transformer (T1) for receiving the second induced voltage therefrom, and rectifies and filters the second induced voltage so as to output a second DC output voltage ($V_2$) of 5V to a load (not shown). The third rectifier and filter circuit 14 is coupled to the third secondary winding ($L_{s3}$) of the transformer (T1) for receiving the third induced voltage therefrom, and rectifies and filters the third induced voltage so as to output a third DC output voltage ($V_3$). The regulator circuit 15 is coupled to the third rectifier and filter circuit 14 for receiving the third DC output voltage ($V_3$) therefrom. The regulator circuit 15 regulates the third DC output voltage ($V_3$) based on a control signal to generate a regulated third DC output voltage ($V_3'$), and outputs the regulated third DC output voltage ($V_3'$) of 3.3V to a load (not shown). The feedback circuit 16 is coupled to the regulator circuit 15 for receiving the regulated third DC output voltage ($V_3'$) therefrom, and generates a feedback signal based on the regulated third DC output voltage ($V_3'$). The regulator control circuit 17 is coupled to the regulator circuit 15 and the feedback circuit 16. The regulator control circuit 17 receives the feedback signal from the feedback circuit 16, generates the control signal based on the feedback signal, and outputs the control signal to the regulator circuit 15.

Under such configuration, it is evident that to output a plurality of different DC output voltages, the conventional multi-output DC-to-DC power converter 1 must include a plurality of different secondary windings respectively for the different DC output voltages, and a plurality of rectifier and filter circuits that are coupled respectively to the secondary windings. In this way, the number of the secondary windings ($L_{s1}$, $L_{s2}$, $L_{s3}$) of the transformer (T1) is increased, and the circuitry of the transformer (T1) becomes more complicated. Therefore, the manufacturing cost and the volume of the transformer (T1) are both increased.

SUMMARY

Therefore, an object of the disclosure is to provide a multi-output DC-to-DC power converter that can alleviate the drawbacks of the prior art.

According to the disclosure, the multi-output DC-to-DC power converter includes a transformer, a primary side control circuit, a rectifier and filter circuit and a converting unit.

The transformer has a primary winding and a secondary winding unit.

The primary side control circuit is used to receive a DC input voltage, and is coupled to the primary winding of the transformer. The primary side control circuit is configured to control supply of the DC input voltage to the primary winding of the transformer. The transformer generates an induced voltage across the secondary winding unit of the transformer when the DC input voltage is controlled by the primary side control circuit to be supplied to the primary winding of the transformer.

The rectifier and filter circuit has an input side that is coupled to the secondary winding unit of the transformer for receiving the induced voltage, and an output side. The rectifier and filter circuit is configured to rectify and filter the induced voltage so as to output at least a first DC voltage at the output side thereof.

The converting unit is coupled to the output side of the rectifier and filter circuit for receiving the first DC voltage therefrom. The converting unit is configured to generate, based at least on the first DC voltage, at least a first DC output voltage, and a second DC output voltage different from the first DC output voltage.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
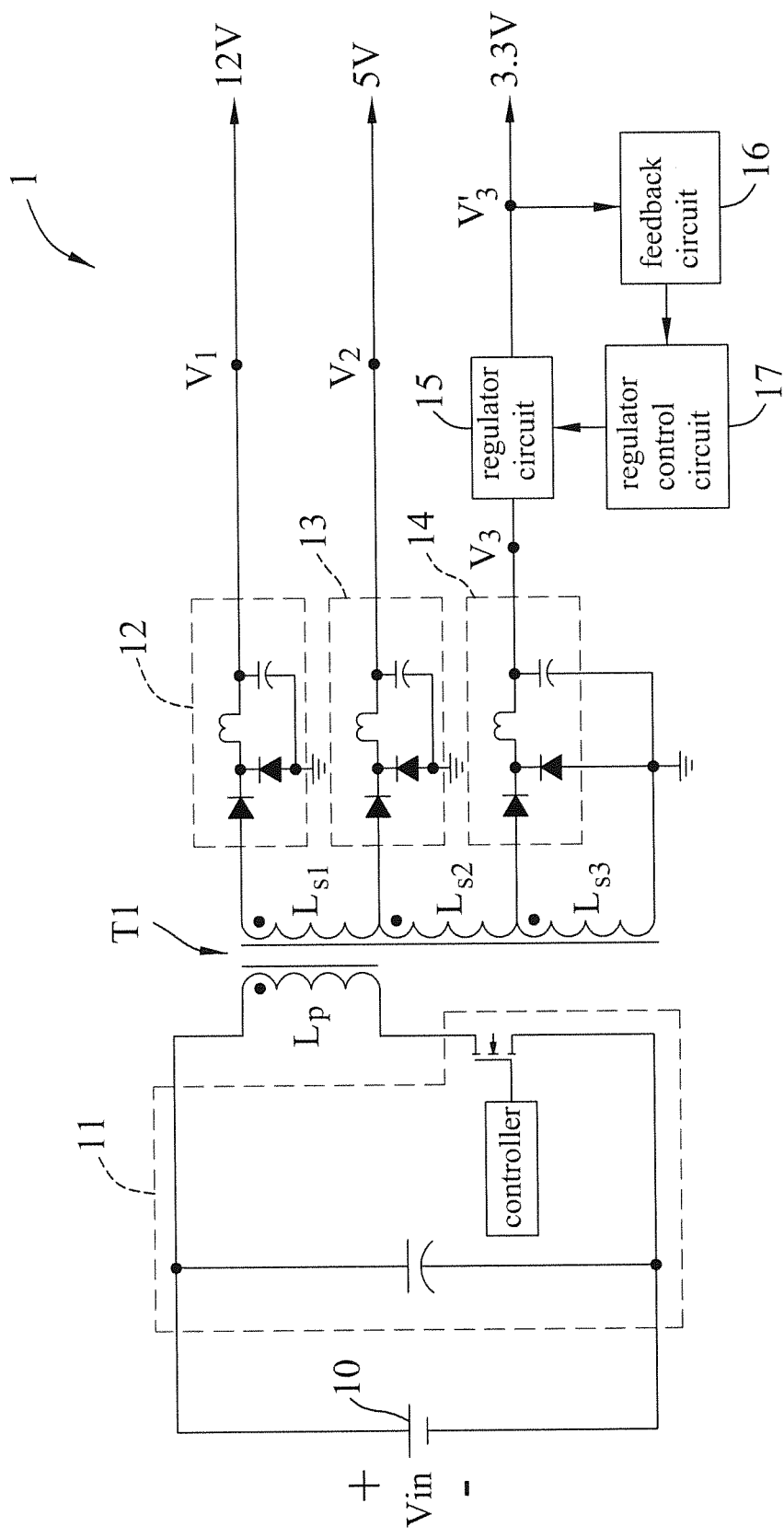
FIG. 1 is a schematic electrical circuit block diagram illustrating a conventional multi-output DC-to-DC power converter.

Before the disclosure is described in greater detail, it should be noted that like elements are denoted by the same reference numerals throughout the disclosure. In addition, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 2:
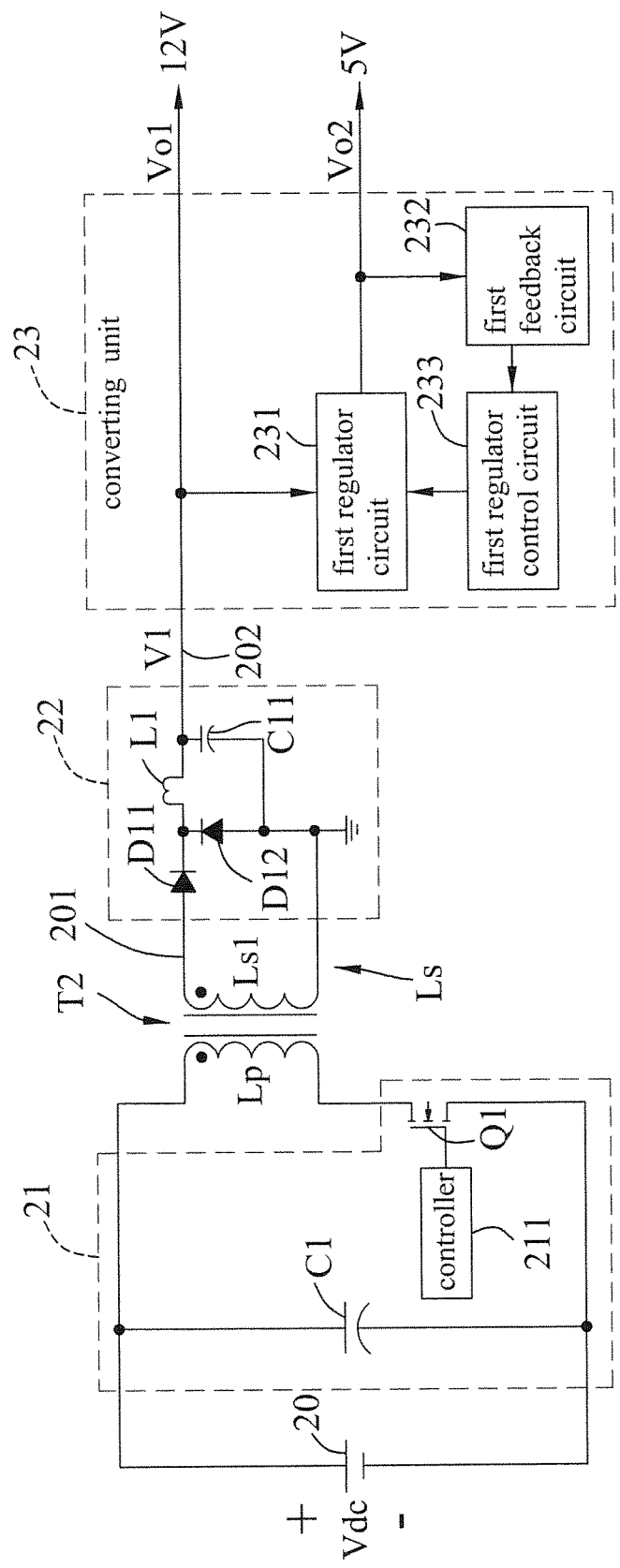
FIG. 2 is a schematic electrical circuit block diagram illustrating the first embodiment of a multi-output DC-to-DC power converter according to the disclosure.

Referring to FIG. 2, the first embodiment of a multi-output DC-to-DC power converter according to the disclosure is shown to include a transformer (T2), a primary side control circuit 21, a rectifier and filter circuit 22 and a converting unit 23. In this embodiment, the multi-output DC-to-DC power converter is implemented as, for example, a forward type power converter.

The transformer (T2) has a primary winding (Lp) that has a dotted end and a non-dotted end, and a secondary winding unit (Ls). In this embodiment, the secondary winding unit (Ls) has, for example, a single secondary winding (Ls1) that has a dotted end and a grounded non-dotted end.

The primary side control circuit 21 is used to receive a DC input voltage (Vdc) from an input power source 20, and is coupled to the dotted and non-dotted ends of the primary winding (Lp) of the transformer (T2). The primary side control circuit 21 is configured to control supply of the DC input voltage (Vdc) to the primary winding (Lp). When the DC input voltage (Vdc) is controlled by the primary side control circuit 21 to be supplied to the primary winding (Lp), the transformer (T2) generates an induced voltage across the secondary winding (Ls1) thereof. The primary side control circuit 21 includes a capacitor (C1), a power switch (Q1) and a controller 211.

The capacitor (C1) is coupled in parallel to the input power source 20. The power switch (Q1) is coupled between the non-dotted end of the primary winding (Lp) of the transformer (T2) and the input power source 20. The controller 211 is coupled to the power switch (Q1), and is operable to control the power switch (Q1) to be in a conducting state or a non-conducting state. When the power switch (Q1) conducts (i.e., is in the conducting state), the DC input voltage (Vdc) is supplied to the primary winding (Lp).

The rectifier and filter circuit 22 has an input side that is coupled to the secondary winding (Ls1) of the secondary winding unit (Ls) for receiving the induced voltage therefrom, and an output side. The input and output sides of the rectifier and filter circuit 22 respectively have a single input end 201 that is coupled to the dotted end of the secondary winding (Ls1), and a single output end 202. The rectifier and filter circuit 22 is configured to rectify and filter the induced voltage from the input end 201 so as to output a first DC voltage (V1) at the output end 202 of the output side thereof. The rectifier and filter circuit 22 includes first and second diodes (D11, D12), an inductor (L1) and a capacitor (C11).

The first diode (D11) has an anode coupled to the input end 201, and a cathode. The inductor (L1) is coupled between the cathode of the first diode (D11) and the output end 202. The second diode (D12) has a grounded anode, and a cathode that is coupled to the cathode of the first diode (D11). The capacitor (C11) is coupled between the output end 202 and ground. In this embodiment, for example, the capacitor (C11) may be a polar capacitor, and has a positive terminal that is coupled to the output end 202, and a grounded negative terminal.

The converting unit 23 is coupled to the output end 202 of the output side of the rectifier and filter circuit 22 for receiving the first DC voltage (V1) therefrom. The converting unit 23 is configured to generate, based on the first DC voltage (V1), a first DC output voltage (Vo1) of, for example, 12V, and a second DC output voltage (Vo2) of, for example, by, different from the first DC output voltage (Vo1). In this embodiment, the converting unit 23 permits the first DC voltage (V1) to be outputted as the first DC output voltage (Vo1), and includes a first regulator circuit 231, a first feedback circuit 232 and a first regulator control circuit 233.

The first regulator circuit 231 is coupled to the output end 202 of the rectifier and filter circuit 22 for receiving the first DC voltage (V1) therefrom. The first regulator circuit 231 is configured to convert the first DC voltage (V1) into the second DC output voltage (Vo2) based on a first control signal, and to output the second DC output voltage (Vo2). The first feedback circuit 232 is coupled to the first regulator circuit 231 for receiving the second DC output voltage (Vo2) therefrom, and is configured to generate a first feedback signal based on the second DC output voltage (Vo2). The first regulator control circuit 233 is coupled to the first regulator circuit 231 and the first feedback circuit 232, and receives the first feedback signal from the first feedback circuit 232. The first regulator control circuit 233 is configured to generate the first control signal based on the first feedback signal, and outputs the first control signal to the first regulator circuit 231. Therefore, the first regulator circuit 231 can stably output the second DC output voltage (Vo2). The second DC output voltage (Vo2) may not change, for example, with the change of the DC input voltage (Vdc) or with the change of a backend load coupled to the first regulator circuit 231.

In such a configuration, due to the presence of the first regulator circuit 231, the first feedback circuit 232 and the first regulator control circuit 233 of the converting unit 23, the converting unit 23 can not only output the first DC output voltage (Vo1) but also stably output the second DC output voltage (Vo2). In this case, the second and third secondary windings ($L_{s2}$, $L_{s3}$) of the transformer (T1) and the second and third rectifier and filter circuits 13, 14 required in the prior art (see FIG. 1) can be omitted. Therefore, the transformer (T2) of the multi-output DC-to-DC power converter of this disclosure has a relatively simple circuitry, and the manufacturing cost and the volume of the transformer (T2) are both reduced.

Figure 3:
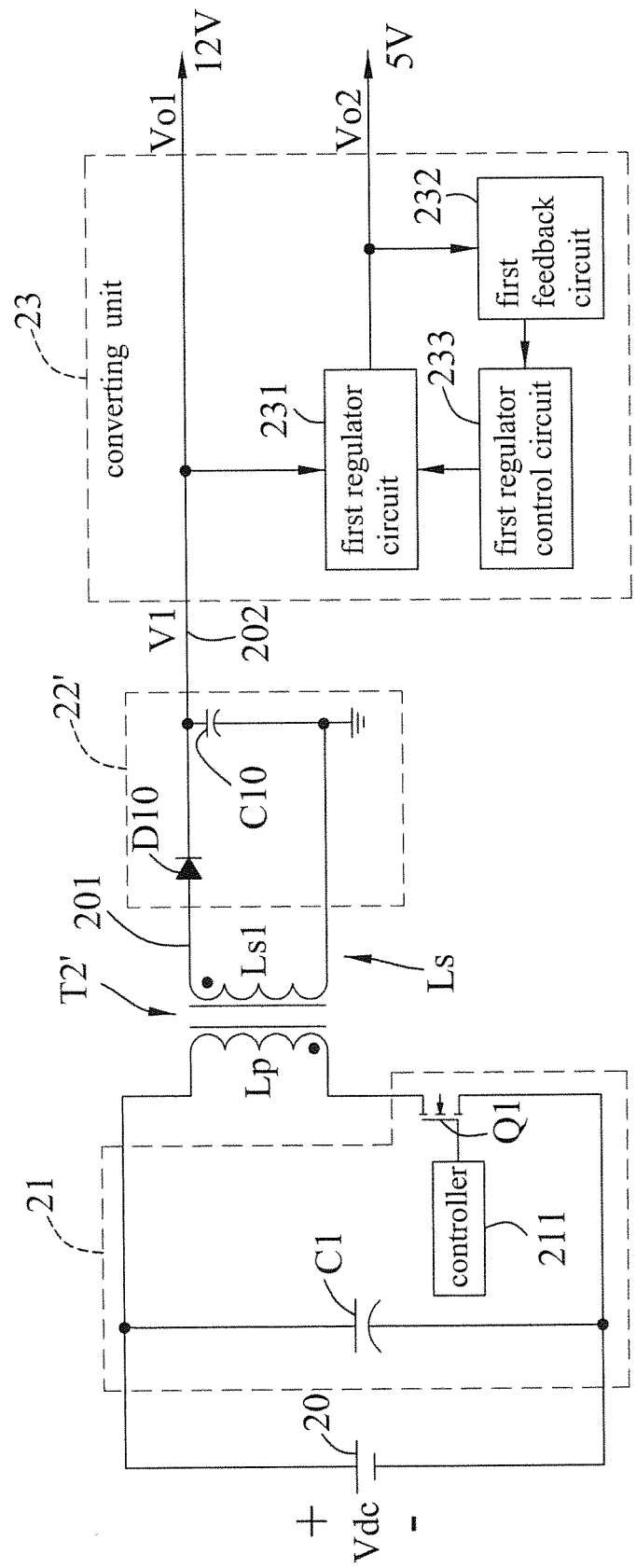
FIG. 3 is a schematic electrical circuit block diagram illustrating a variation of the first embodiment.

FIG. 3 illustrates a variation of the first embodiment. Unlike the implementation shown in FIG. 2, the dotted and non-dotted ends of the primary winding (Lp) are coupled respectively to the power switch (Q1) and a positive terminal of the input power source 20. Furthermore, the rectifier and filter circuit 22' includes a diode (D10) and a capacitor (C10).

Anode and cathode of the diode (D10) are coupled respectively to the input end 201 and the output end 202. The capacitor (C10) is coupled between the output end 202 and ground. In this embodiment, the multi-output DC-to-DC power converter is a flyback type power converter. The capacitor (C10) may be, for example, a polar capacitor, and has a positive terminal that is coupled to the output end 202, and a grounded negative terminal.

It is noted that, in this embodiment, the transformer (T2') is used to generate the induced voltage, store the electric energy induced from the primary winding (Lp), and transfer the electric energy to the rectifier and filter circuit 22'. However, the transformer (T2) of FIG. 2 is only used to generate the induced voltage based on the DC input voltage (Vdc) and a turns ratio of the secondary winding (Ls1) to the primary winding (Lp), while the electric energy induced from the primary winding (Lp) is stored by the inductor (L1) of the rectifier and filter circuit 22 of FIG. 2.

Figure 4:
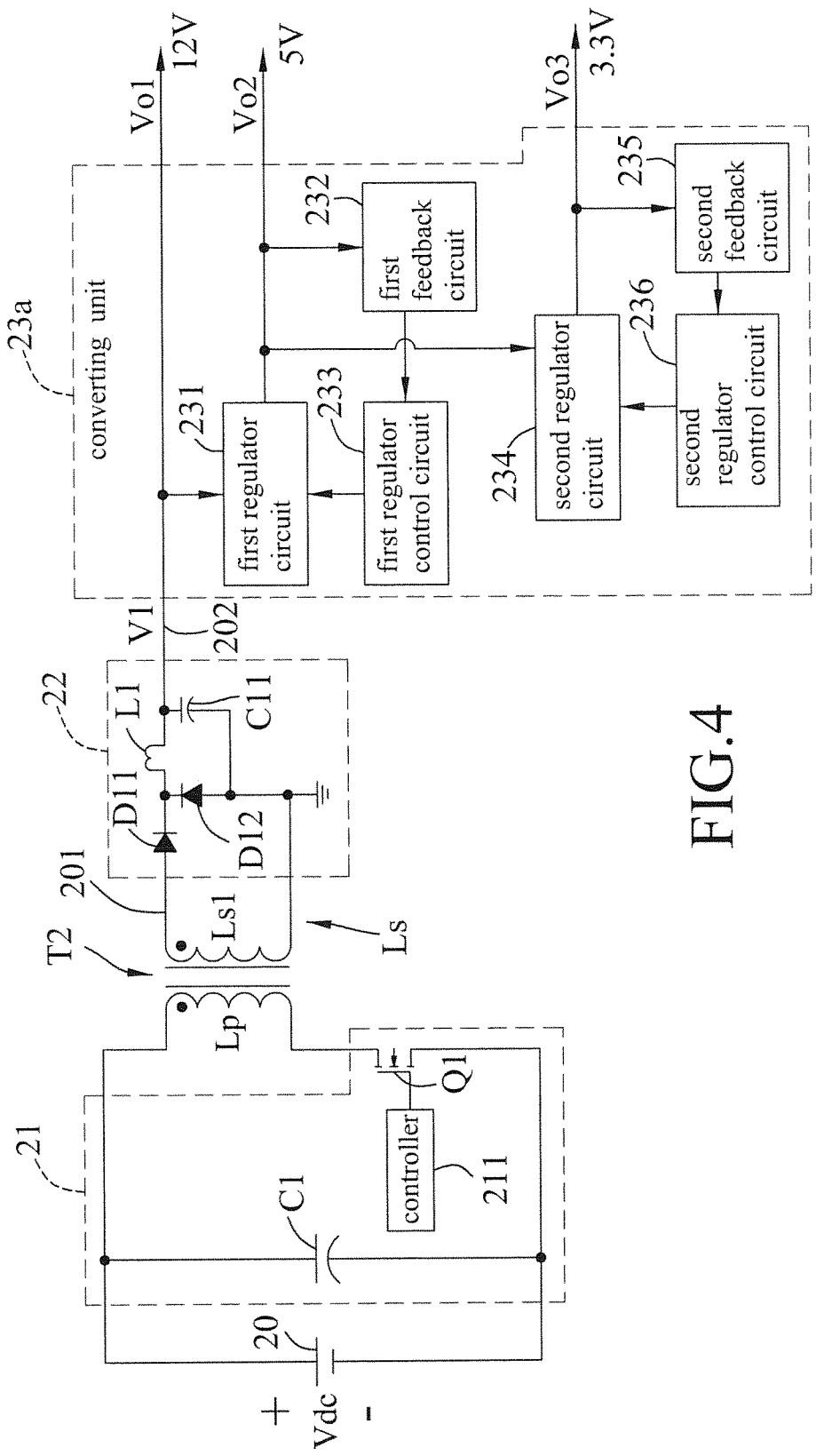
FIG. 4 is a schematic electrical circuit block diagram illustrating the second embodiment of a multi-output DC-to-DC power converter according to the disclosure.

FIG. 4 illustrates the second embodiment of a multi-output DC-to-DC power converter according to the disclosure, which is a modification of the first embodiment. Unlike the first embodiment, the converting unit (23a) further generates a third DC output voltage (Vo3) of, for example, 3.3V, different from the first and second DC output voltages (Vo1, Vo2) based on the second DC output voltage (Vo2). The converting unit (23a) further includes a second regulator circuit 234, a second feedback circuit 235 and a second regulator control circuit 236.

The second regulator circuit 234 is coupled to the first regulator circuit 231 for receiving the second DC output voltage (Vo2) therefrom. The second regulator circuit 234 is configured to convert the second DC output voltage (Vo2) into the third DC output voltage (Vo3) based on a second control signal, and to output the third DC output voltage (Vo3). The second feedback circuit 235 is coupled to the second regulator circuit 234 for receiving the third DC output voltage (Vo3) therefrom. The second feedback circuit 235 is configured to generate a second feedback signal based on the third DC output voltage (Vo3). The second regulator control circuit 236 is coupled to the second regulator circuit 234 and the second feedback circuit 235, and receives the second feedback signal from the second feedback circuit 235. The second regulator control circuit 236 is configured to generate the second control signal based on the second feedback signal, and outputs the second control signal to the second regulator circuit 234. Therefore, the second regulator circuit 234 can stably output the third DC output voltage (Vo3). The third DC output voltage (Vo3) may not change, for example, with the change of the DC input voltage (Vdc) or with the change of a backend load coupled to the second regulator circuit 234.

Thus, similarly, the multi-output DC-to-DC power converter can further generate one or more other DC output voltages different from the first to third DC output voltages (Vo1, Vo2, Vo3) by one or more additional regulator circuits, each of which may be coupled to one of the rectifier and filter circuit 22 and the first and second regulator circuits 231, 234 for receiving a corresponding one of the first DC voltage (V1) and the second and third DC output voltages (Vo2, Vo3). At the same time, the multi-output DC-to-DC power converter can use one or more additional feedback circuits and one or more additional regulator control circuits to operate in coordination with said one or more additional regulator circuits to regulate said one or more other DC output voltages. In this way, the multi-output DC-to-DC power converter can generate multiple DC output voltages without increasing the numbers of the secondary windings of the transformer (T2) and of the rectifier and filter circuits.

Figure 5:
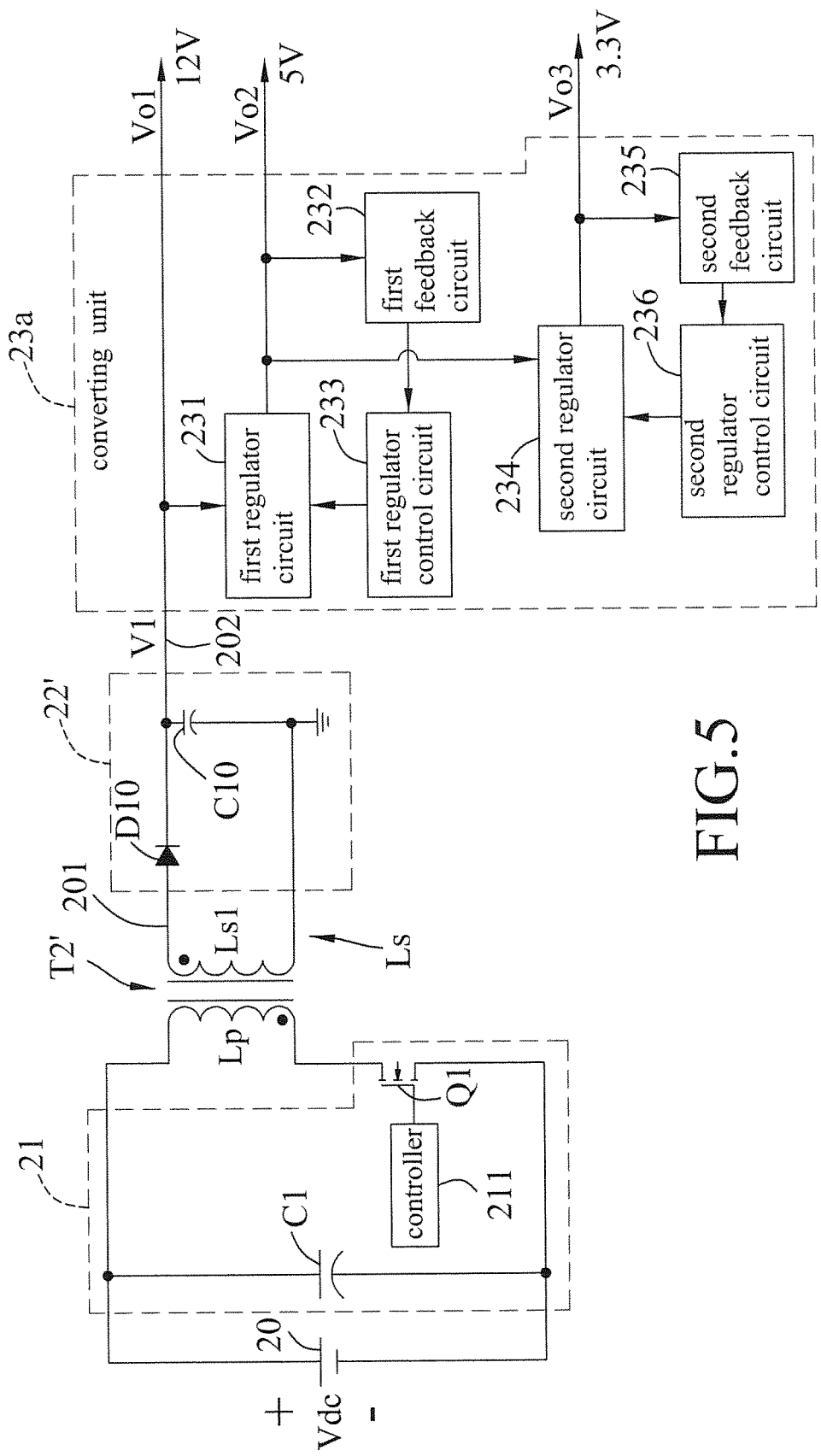
FIG. 5 is a schematic electrical circuit block diagram illustrating a variation of the second embodiment.

FIG. 5 illustrates a variation of the second embodiment, in which the configurations and operations of the transformer (T2') and the rectifier and filter circuit 22' are respectively the same as those of FIG. 3. Thus, details of the same are omitted herein for the sake of brevity. It is noted that, in this embodiment, the multi-output DC-to-DC power converter is a flyback type power converter.

Same as previously described in relation to FIG. 3, in this embodiment, the transformer (T2') is used to generate the induced voltage, store the electric energy induced from the primary winding (Lp), and transfer the electric energy to the rectifier and filter circuit 22'. However, the transformer (T2) of FIG. 4 is only used to generate the induced voltage based on the DC input voltage (Vdc) and a turns ratio of the secondary winding (Ls1) to the primary winding (Lp), while the electric energy induced from the primary winding (Lp) is stored by the inductor (L1) of the rectifier and filter circuit 22 of FIG. 4.

Figure 6:
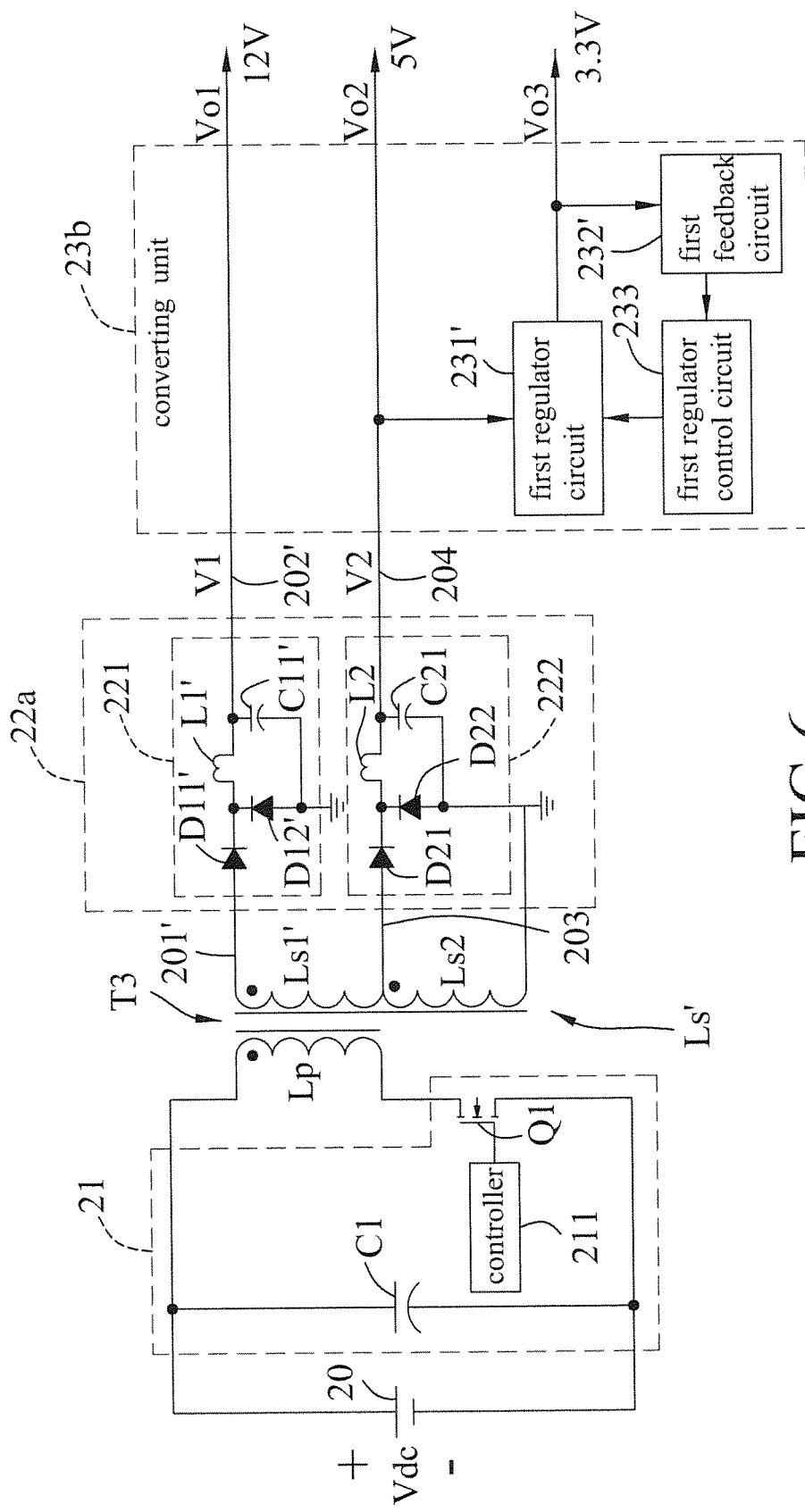
FIG. 6 is a schematic electrical circuit block diagram illustrating the third embodiment of a multi-output DC-to-DC power converter according to the disclosure.

FIG. 6 illustrates the third embodiment of a multi-output DC-to-DC power converter according to the disclosure, which is a modification of the first embodiment. Unlike the first embodiment, the secondary winding unit (Ls') of the transformer (T3) has first and second secondary windings (Ls1', Ls2). The first secondary winding (Ls1') has dotted and non-dotted ends. The second secondary winding (Ls2) has a dotted end that is coupled to the non-dotted end of the first secondary winding (Ls1'), and a grounded non-dotted end. The induced voltage generated by the transformer (T3) at the secondary winding unit (Ls') has a first induced voltage portion across the first secondary winding (Ls1'), and a second induced voltage portion across the second secondary winding (Ls2). In this embodiment, the number of turns of the first secondary winding (Ls1') differs from that of the second secondary winding (Ls2).

Furthermore, the input side of the rectifier and filter circuit (22a) has first and second input ends 201', 203 that are coupled respectively to the dotted ends of the first and second secondary windings (Ls1', Ls2). The output side of the rectifier and filter circuit (22a) has a first output end 202' and a second output end 204. The rectifier and filter circuit (22a) further outputs a second DC voltage (V2) different from the first DC voltage (V1) based on the second induced voltage portion, and includes first and second circuit portions 221, 222.

In this embodiment, the first circuit portion 221 has the first input and first output ends 201', 202'. The first circuit portion 221 is configured to rectify and filter the first induced voltage portion so as to output the first DC voltage (V1) at the first output end 202' thereof. The first circuit portion 221 includes first and second diodes (D11', D12'), a first inductor (L1') and a first capacitor (C11'). The first diode (D11') has an anode that is coupled to the first input end 201', and a cathode. The first inductor (L1') is coupled between the cathode of the first diode (D11') and the first output end 202'. The second diode (D12') has a grounded anode, and a cathode that is coupled to the cathode of the first diode (D11'). The first capacitor (C11') is coupled between the first output end 202' and ground.

The second circuit portion 222 has the second input and second output ends 203, 204. The second circuit portion 222 is configured to rectify and filter the second induced voltage portion so as to output the second DC voltage (V2) at the second output end 204 thereof. The second circuit portion 222 includes third and fourth diodes (D21, D22), a second inductor (L2) and a second capacitor (C21). The third diode (D21) has an anode that is coupled to the second input end 203, and a cathode. The second inductor (L2) is coupled between the cathode of the third diode (D21) and the second output end 204. The fourth diode (D22) has a grounded anode, and a cathode that is coupled to the cathode of the third diode (D21). The second capacitor (021) is coupled between the second output end 204 and ground.

Moreover, the converting unit (23b) further receives the second DC voltage (V2) from the second output end 204, and further generates, based on the second DC voltage (V2), a third DC output voltage (Vo3) of, for example, 3.3V, different from the first and second DC output voltages (Vo1, Vo2).

In this embodiment, the converting unit (23b) of FIG. 6 may have, for example, its configuration similar to that of the converting unit (23) of FIG. 2. Unlike the implementation shown in FIG. 2, however, the converting unit (23b) permits the first and second DC voltages (V1, V2) to be outputted respectively as the first and second DC output voltages (Vo1, Vo2) of, for example, 12V and 5V. In addition, the first regulator circuit 231' is coupled to the second output end 204 of the second circuit port ion 222 for receiving the second DC voltage (V2) therefrom. The first regulator circuit 231' is configured to convert the second DC voltage (V2) into the third DC output voltage (Vo3) based on the first control signal, and output the third DC output voltage (Vo3). The first feedback circuit 232' receives the third DC output voltage (Vo3) from the first regulator circuit 231', and is configured to generate the first feedback signal based on the third DC output voltage (Vo3).

Figure 7:
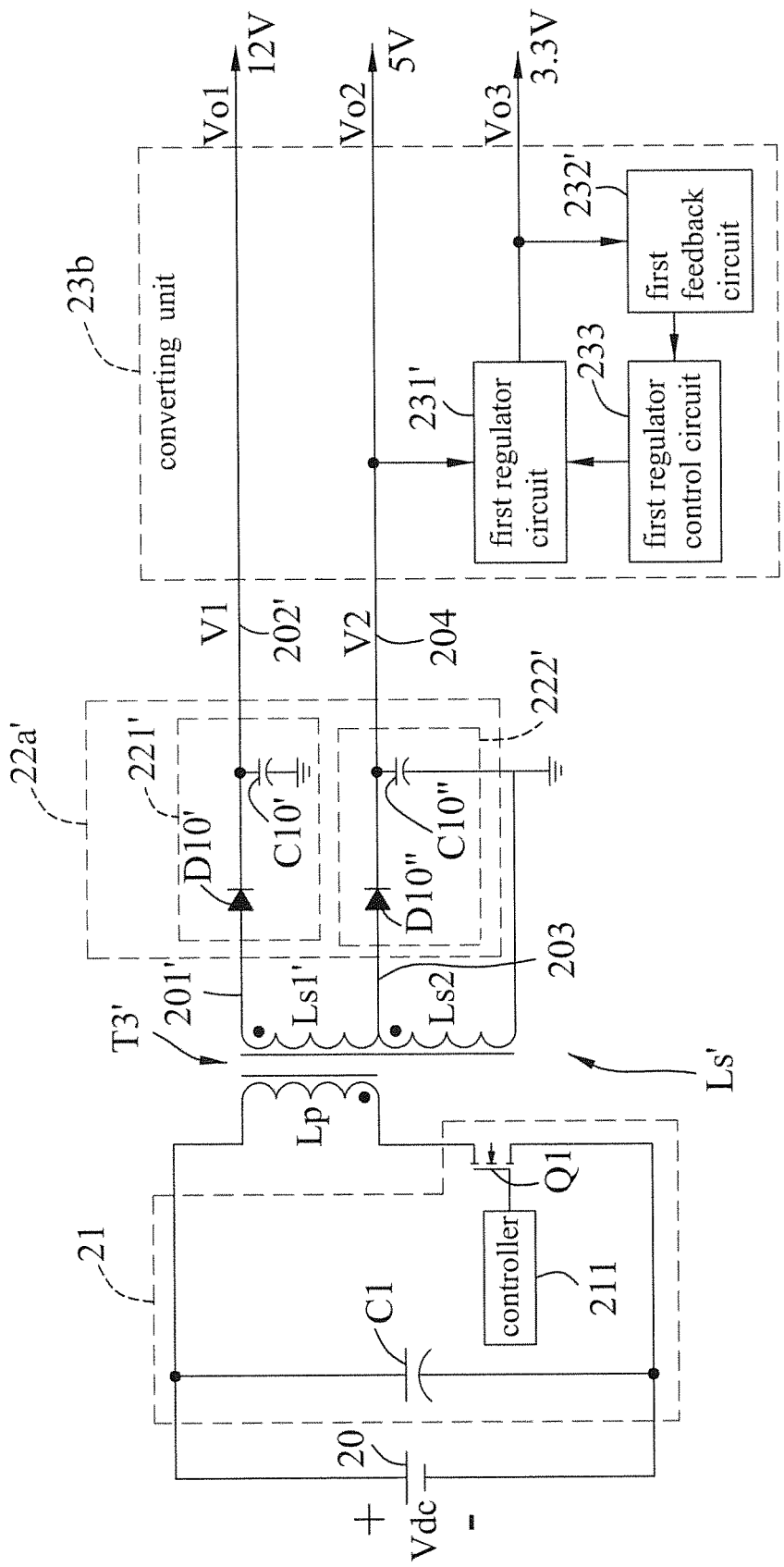
FIG. 7 is a schematic electrical circuit block diagram illustrating a variation of the third embodiment.

FIG. 7 illustrates a variation of the third embodiment. Unlike the implementation shown in FIG. 6, the dotted and non-dotted ends of the primary winding (Lp) of FIG. 7 are coupled respectively to the power switch (Q1) and the positive terminal of the input power source 20.

Furthermore, in this embodiment, the first circuit portion 221' of the rectifier and filter circuit (22a') includes a first diode (D10') and a first capacitor (C10'). Anode and cathode of the first diode (D10') are coupled respectively to the first input and first output ends 201', 202'. The first capacitor (C10') is coupled between the first output end 202' and ground. The second circuit portion 222' of the rectifier and filter circuit (22a') includes a second diode (D10") and a second capacitor (C10"). Anode and cathode of the second diode (D10") are coupled respectively to the second input and second output ends 203, 204. The second capacitor (C10") is coupled between the second output end 204 and ground. In this embodiment, the multi-output DC-to-DC power converter is a flyback type power converter.

It is noted that, in this embodiment, the transformer (T3') is used to generate the induced voltage, store the electric energy induced from the primary winding (Lp), and transfer the electric energy to the first and second circuit portions 221', 222'. On the other hand, the transformer (T3) of FIG. 6 is only used to generate the first induced voltage portion based on the DC input voltage (Vdc) and a turns ratio of the first secondary winding (Ls1) to the primary winding (Lp), and generate the second induced voltage portion based on the DC input voltage (Vdc) and a turns ratio of the second secondary winding (Ls2) to the primary winding (Lp), while the electric energy induced from the primary winding (Lp) may be stored by the first and second inductors (L1', L2) of FIG. 6.

Figure 8:
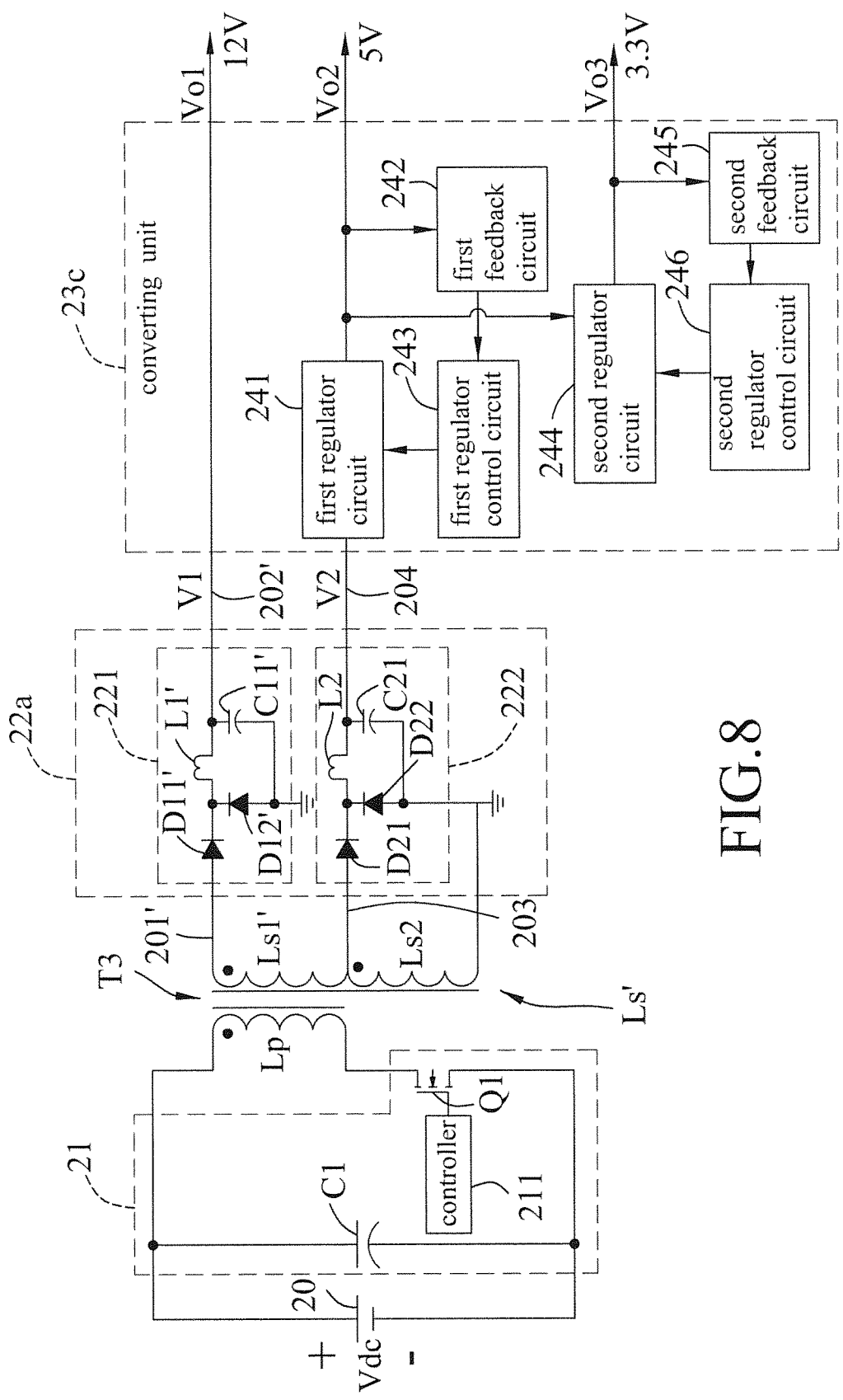
FIG. 8 is a schematic electrical circuit block diagram illustrating the fourth embodiment of a multi-output DC-to-DC power converter according to the disclosure.

FIG. 8 illustrates the fourth embodiment of a multi-output DC-to-DC power converter according to the disclosure, which is a modification of the third embodiment. Unlike the third embodiment, the converting unit (23c) of FIG. 8 permits the first DC voltage (V1) to be outputted as the first DC output voltage (Vo1) of, for example, 12V. The converting unit (23c) includes first and second regulator circuits 241, 244, first and second feedback circuits 242, 245 and first and second regulator control circuits 243, 246.

The first regulator circuit 241 is coupled to the second output end 204 for receiving the second DC voltage (V2) therefrom. The first regulator circuit 241 is configured to regulate the second DC voltage (V2) based on a first control signal to generate the second DC output voltage (Vo2), and outputs the second DC output voltage (Vo2) of, for example, 5V. The first feedback circuit 242 is coupled to the first regulator circuit 241 for receiving the second DC output voltage (Vo2) therefrom, and is configured to generate a first feedback signal based on the second DC output voltage (Vo2). The first regulator control circuit 243 is coupled to the first regulator circuit 241 and the first feedback circuit 242, and receives the first feedback signal from the first feedback circuit 242. The first regulator control circuit 243 is configured to generate the first control signal based on the first feedback signal, and outputs the first control signal to the first regulator circuit 241.

The second regulator circuit 244 is coupled to the first regulator circuit 241 for receiving the second output voltage (Vo2) therefrom. The second regulator circuit 244 is configured to convert the second DC output voltage (Vo2) into the third DC output voltage (Vo3) of, for example, 3.3V, based on a second control signal from the second regulator control circuits 246. In this embodiment, the second feedback circuit 245 and the second regulator control circuits 246 may have the same configurations and operations respectively as those of the first feedback circuit 232' and the first regulator control circuits 233 of FIG. 6. Thus, details of the same are omitted herein for the sake of brevity.

Figure 9:
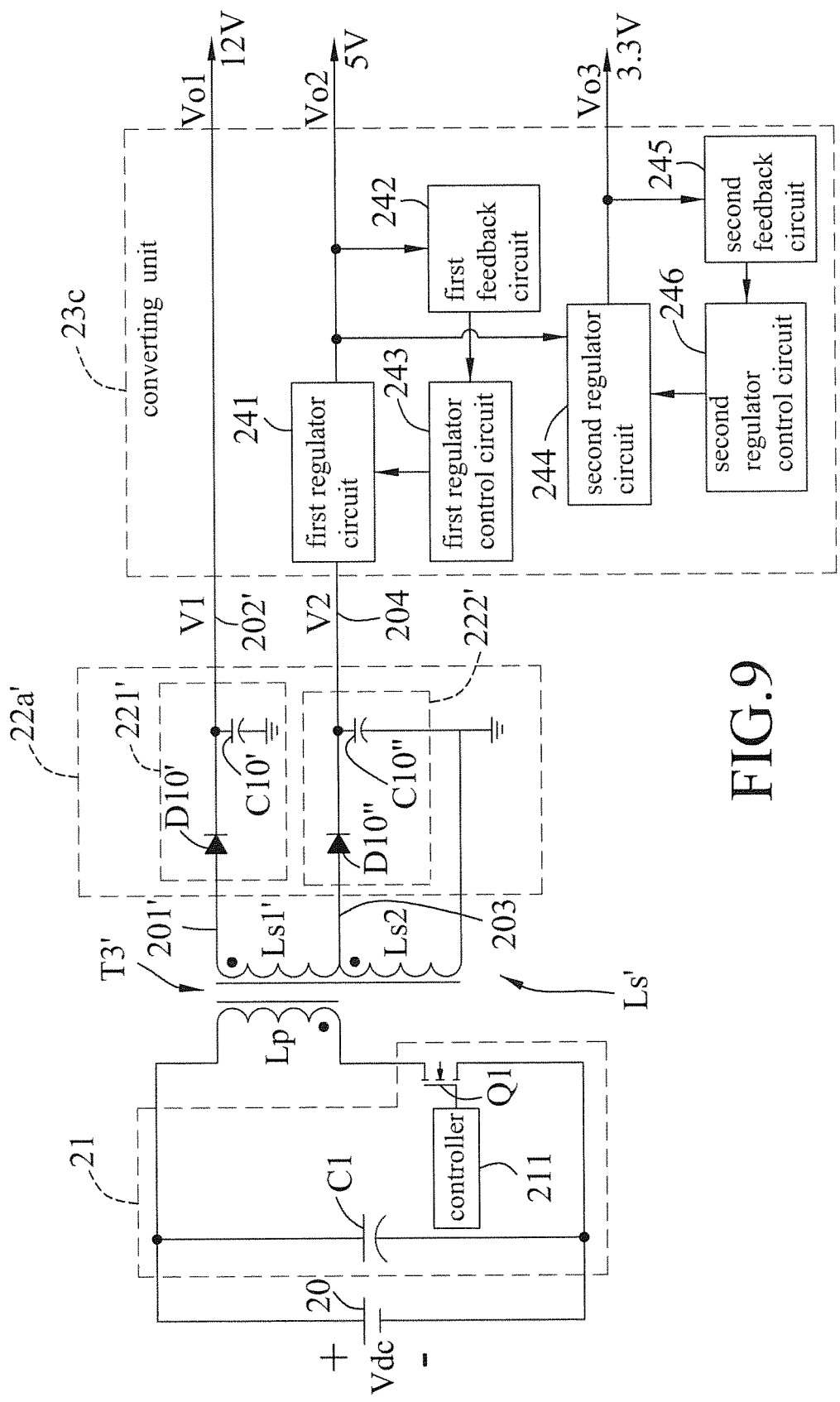
FIG. 9 is a schematic electrical circuit block diagram illustrating a variation of the fourth embodiment.

FIG. 9 illustrates a variation of the fourth embodiment. Unlike the implementation shown in FIG. 8, the configurations and operations of the transformer (T3') and the rectifier and filter circuit (22a') are respectively the same as those of FIG. 7. Thus, details of the same are omitted herein for the sake of brevity. It is noted that, in this embodiment, the multi-output DC-to-DC power converter is a flyback type power converter.

Figure 10:
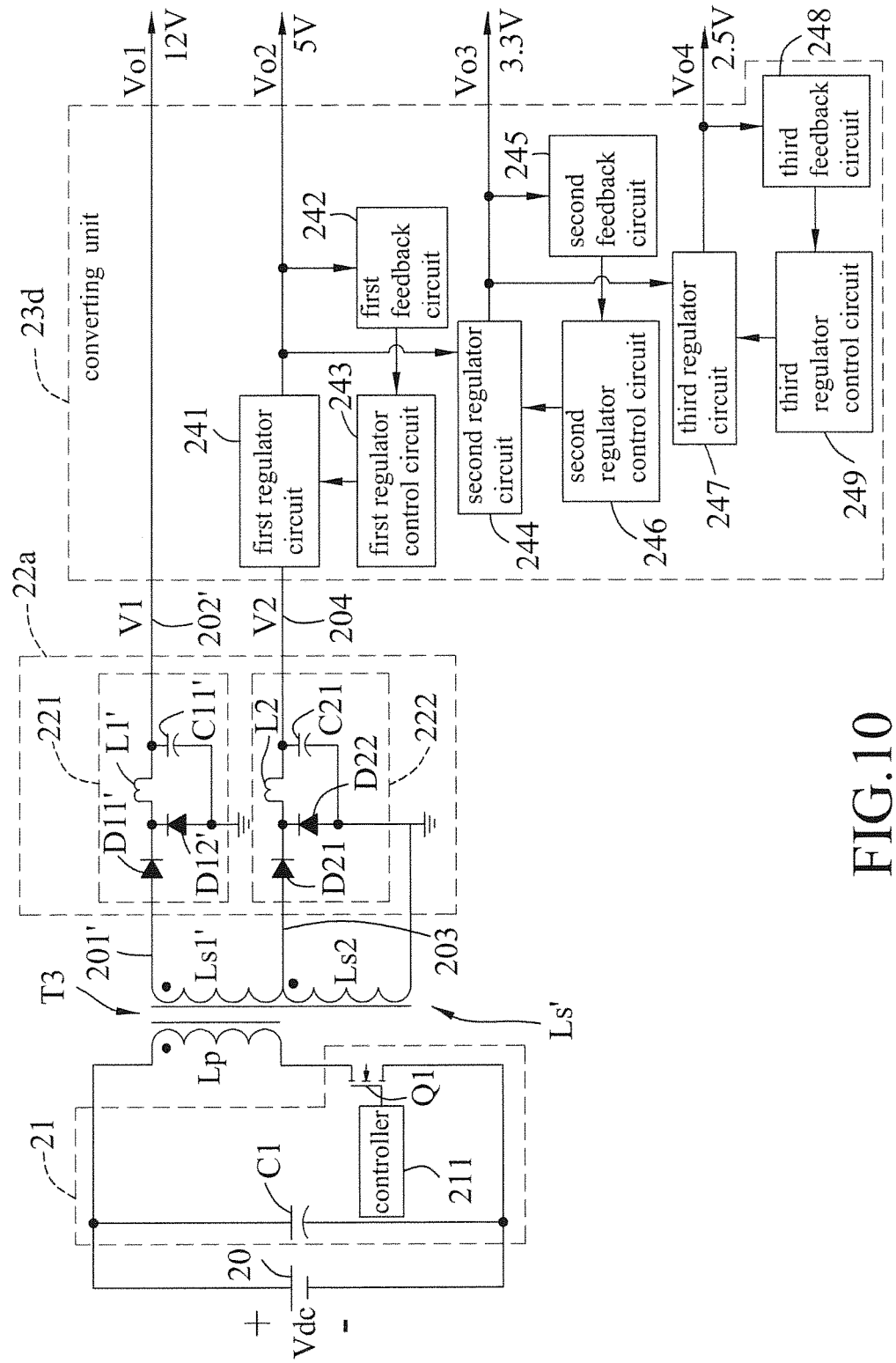
FIG. 10 is a schematic electrical circuit block diagram illustrating the fifth embodiment of a multi-output DC-to-DC power converter according to the disclosure.

FIG. 10 illustrates the fifth embodiment of a multi-output DC-to-DC power converter according to the disclosure, which is a modification of the fourth embodiment. Unlike the fourth embodiment, the converting unit (23d) further generates a fourth DC output voltage (Vo4) of, for example, 2.5V, different from the first to third DC output voltages (Vo1, Vo2, Vo3) based on the third DC output voltage (Vo3). The converting unit (23d) further includes a third regulator circuit 247, a third feedback circuit 248 and a third regulator control circuit 249.

The third regulator circuit 247 is coupled to the second regulator circuit 244 for receiving the third DC output voltage (Vo3) therefrom. The third regulator circuit 247 is configured to convert the third DC output voltage (Vo3) into the fourth DC output voltage (Vo4) based on a third control signal, and outputs the fourth DC output voltage (Vo4). The third feedback circuit 248 is coupled to the third regulator circuit 247 for receiving the fourth DC output voltage (Vo4) therefrom, and is configured to generate a third feedback signal based on the fourth DC output voltage (Vo4). The third regulator control circuit 249 is coupled to the third regulator circuit 247 and the third feedback circuit 248, and receives the third feedback signal from the third feedback circuit 248. The third regulator control circuit 249 is configured to generate the third control signal based on the third feedback signal, and outputs the third control signal to the third regulator circuit 247. Therefore, the third regulator circuit 247 can stably output the fourth DC output voltage (Vo4). The fourth DC output voltage (Vo4) may not change, for example, with the change of the DC input voltage (Vdc) or with the change of a backend load coupled to the third regulator circuit 247.

Thus, similarly, the multi-output DC-to-DC power converter can further generate one or more other DC output voltages different from the first to fourth DC output voltages (Vo1, Vo2, Vo3, Vo4) by one or more additional regulator circuits, each of which may be coupled to one of the first circuit portion 221 and the first to third regulator circuits 241, 244, 247 for receiving a corresponding one of the first DC voltage (V1) and the second to fourth DC output voltages (Vo2, Vo3, Vo4). At the same time, the multi-output DC-to-DC power converter can use one or more additional feedback circuits and one or more additional regulator control circuits to operate in coordination with said one or more additional regulator circuits to regulate said one or more other DC output voltages. In this way, the multi-output DC-to-DC power converter can generate different DC output voltages without increasing the numbers of the secondary windings of the transformer (T3) and of the circuit portions of the rectifier and filter circuit (22a).

Figure 11:
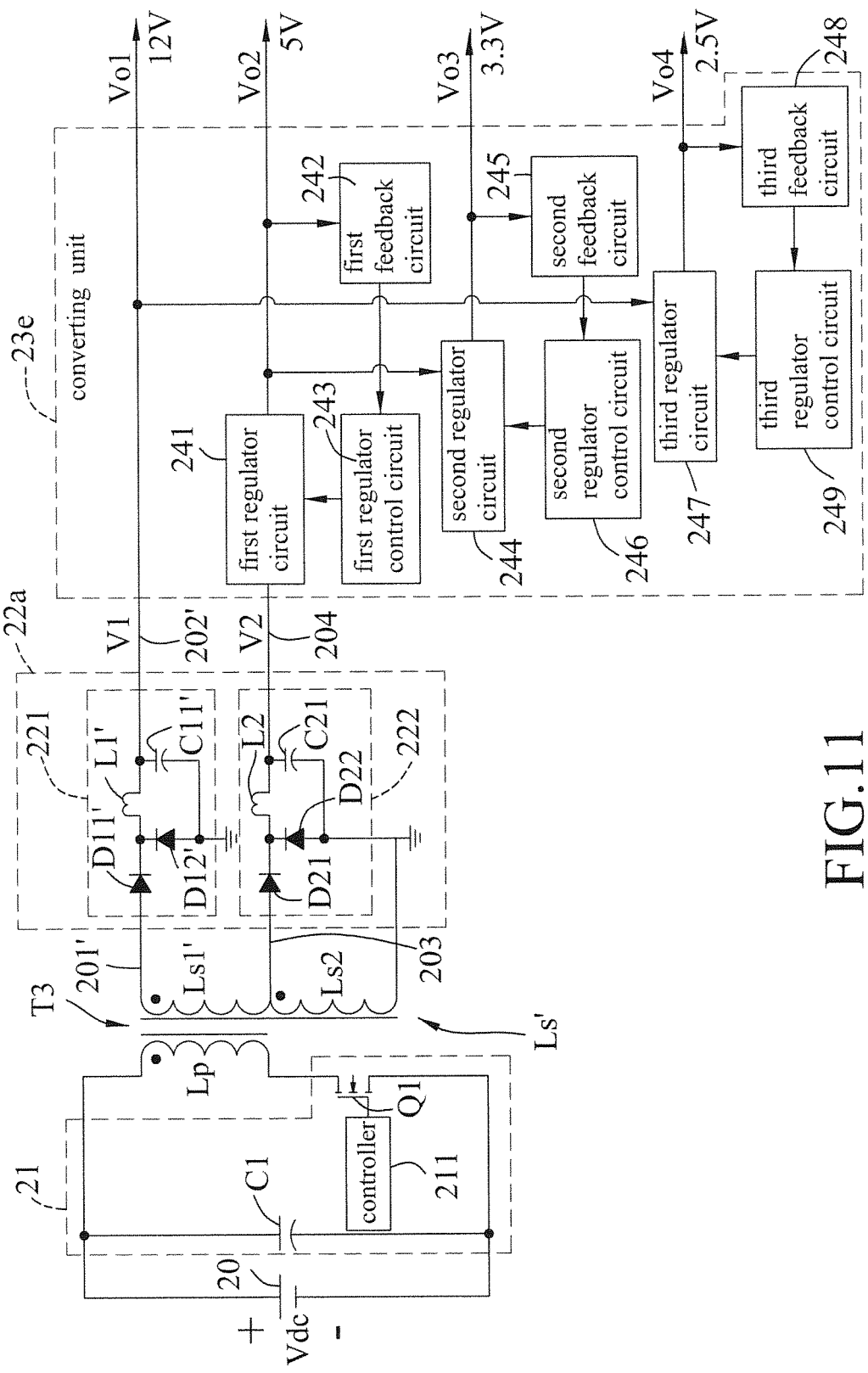
FIG. 11 is a schematic electrical circuit block diagram illustrating a first variation of the fifth embodiment.

FIG. 11 illustrates a first variation of the fifth embodiment. Unlike the implementation shown in FIG. 10, the third regulator circuit 247 of the converting unit (23e) is coupled to the first output end 202' of the rectifier and filter circuit (22a) for receiving the first DC voltage (V1) therefrom. The third regulator circuit 247 is configured to convert the first DC voltage (V1) into the fourth DC output voltage (Vo4) based on the third control signal from the third regulator control circuit 249, and outputs the fourth DC output voltage (Vo4).

Figure 12:
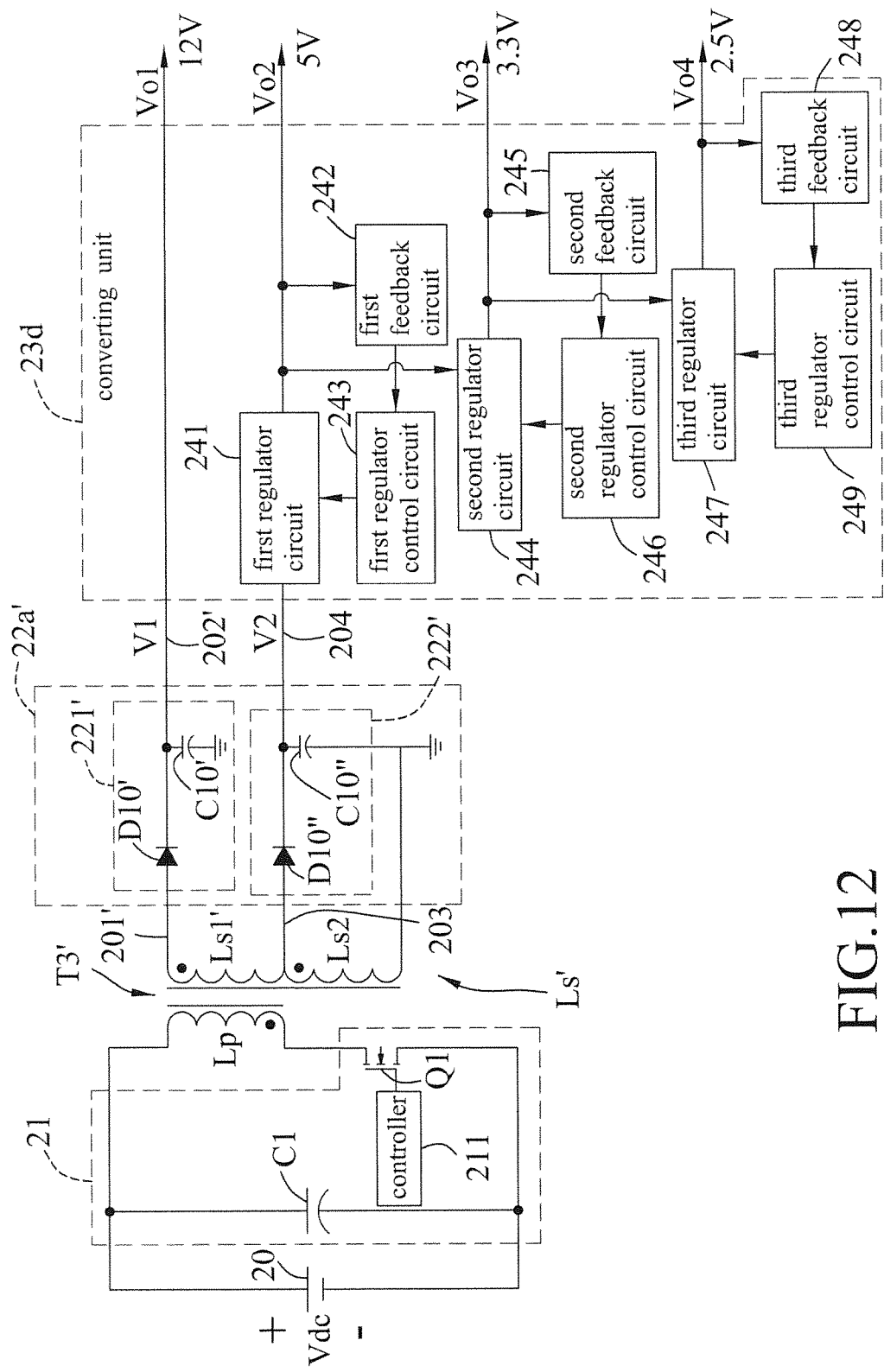
FIG. 12 is a schematic electrical circuit block diagram illustrating a second variation of the fifth embodiment.

FIG. 12 illustrates a second variation of the fifth embodiment. Unlike the implementation shown in FIG. 10, the configurations and operations of the transformer (T3') and the rectifier and filter circuit (22a') are respectively the same as those of FIG. 9. Thus, details of the same are omitted herein for the sake of brevity. It is noted that, in this embodiment, the multi-output DC-to-DC power converter is a flyback type power converter.

Figure 13:
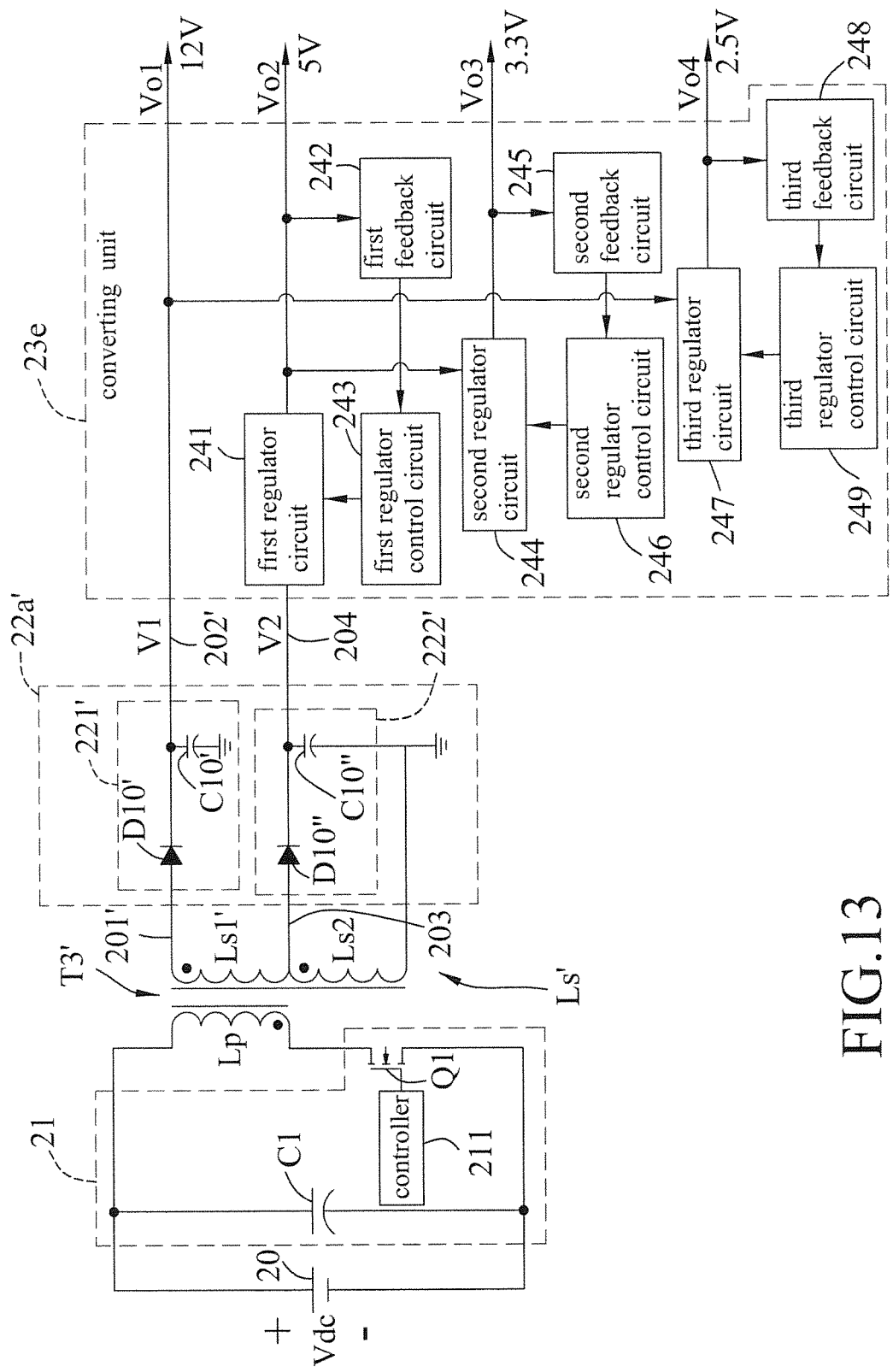
FIG. 13 is a schematic electrical circuit block diagram illustrating a variation of the FIG. 12.

FIG. 13 illustrates a variation of the FIG. 12, in which the converting unit (23e) has the same configuration and operation as those of FIG. 11.

To sum up, due to the presence of the regulator circuit(s) 231, 231', 234, 241, 244, 247, the feedback circuit(s) 232, 232', 235, 242, 245, 248 and the regulator control circuit(s) 233, 243, 236, 246, 249, the multi-output DC-to-DC power converter of this disclosure can convert the DC input voltage (Vdc) into multiple DC output voltages (Vo1, Vo2, Vo3, Vo4), while ensuring that at least one of the DC output voltages (Vo1, Vo2, Vo3, Vo4) is regulated. In this case, the second secondary winding ($L_{s2}$) or the third secondary winding ($L_{s3}$) of the transformer (T1) and the second rectifier and filter circuit 13 or the third rectifier and filter circuits 14 required in the prior art (see FIG. 1) may be omitted in the multi-output DC-to-DC power converter of this disclosure. Therefore, the transformer (T2, T2', T3, T3') of the multi-output DC-to-DC power converter has a relatively simple circuitry, and the manufacturing cost and the volume of the transformer of this disclosure are both reduced.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A multi-output DC-to-DC power converter comprising:
a trans former having a primary winding and a secondary winding unit;
a primary side control circuit used to receive a DC input voltage and coupled to said primary winding of said transformer, said primary side control circuit being configured to control supply of the DC input voltage to said primary winding of said transformer, when the DC input voltage is controlled by said primary side control circuit to be supplied to said primary winding of said transformer, said transformer generating an induced voltage across said secondary winding unit thereof;
a rectifier and filter circuit having an input side that is coupled to said secondary winding unit of said transformer for receiving the induced voltage, and an output side, said rectifier and filter circuit being configured to rectify and filter the induced voltage in order to output at least a first DC voltage at said output side thereof; and
a converting unit coupled to said output side of said rectifier and filter circuit for receiving the first DC voltage therefrom, said converting unit being configured to generate, based at least on the first DC voltage, at least a first DC output voltage, and a second DC output voltage different from the first DC output voltage.

2. The multi-output DC-to-DC power converter of claim 1, wherein:
said secondary winding unit of said transformer has a single secondary winding that has a dotted end and a grounded non-dotted end;
said input and output sides of said rectifier and filter circuit respectively have a single input end that is coupled to said dotted end of said secondary winding, and a single output end; and
said converting unit permits the first DC voltage to be outputted as the first DC output voltage, and includes
a first regulator circuit coupled to said output end of said rectifier and filter circuit for receiving the first DC voltage therefrom, said first regulator circuit being configured to convert the first DC voltage into the second DC output voltage based on a first control signal, and output the second DC output voltage,
a first feedback circuit coupled to said first regulator circuit for receiving the second DC output voltage therefrom, and configured to generate a first feedback signal based on the second DC output voltage, and
a first regulator control circuit coupled to said first regulator circuit and said first feedback circuit, said first regulator control circuit receiving the first feedback signal from said first feedback circuit, being configured to generate the first control signal based on the first feedback signal, and outputting the first control signal to said first regulator circuit.

3. The multi-output DC-to-DC power converter of claim 2, wherein said converting unit further generates a third DC output voltage different from the first and second DC output voltages based on the second DC output voltage, and further includes:
  a second regulator circuit coupled to said first regulator circuit for receiving the second DC output voltage therefrom, said second regulator circuit being configured to convert the second DC output voltage into the third DC output voltage based on a second control signal, and output the third DC output voltage;
  a second feedback circuit coupled to said second regulator circuit for receiving the third DC output voltage therefrom, and configured to generate a second feedback signal based on the third DC output voltage; and
  a second regulator control circuit coupled to said second regulator circuit and said second feedback circuit, said second regulator control circuit receiving the second feedback signal from said second feedback circuit, being configured to generate the second control signal based on the second feedback signal, and outputting the second control signal to said second regulator circuit.

4. The multi-output DC-to-DC power converter of claim 2, wherein:
  said rectifier and filter circuit includes
    a first diode having an anode coupled to said input end, and a cathode,
    an inductor coupled between said cathode of said first diode and said output end,
    a second diode having a grounded anode, and a cathode coupled to said cathode of said first diode, and
    a capacitor coupled between said output end and ground; and
  said multi-output DC-to-DC power converter is a forward type power converter.

5. The multi-output DC-to-DC power converter of claim 2, wherein:
  said rectifier and filter circuit includes
    a diode having an anode and a cathode that are coupled respectively to said input end and said output end, and
    a capacitor coupled between said output end and ground; and
  said multi-output DC-to-DC power converter is a flyback type power converter.

6. The multi-output DC-to-DC power converter of claim 1, wherein:
  said secondary winding unit of said transformer has a first secondary winding that has a dotted end and a non-dotted end, and a second secondary winding that has a dotted end coupled to said non-dotted end of said first secondary winding, and a grounded non-dotted end, the induced voltage having a first induced voltage portion across said first secondary winding, and a second induced voltage portion across said second secondary winding;
  said input side of said rectifier and filter circuit has a first input end and a second input end that are coupled respectively to said dotted ends of said first and second secondary windings, said output side of said rectifier and filter circuit having a first output end and a second output end, said rectifier and filter circuit further outputting a second DC voltage based on the second induced voltage portion, and including
    a first circuit portion that has said first input end and said first output end and that is configured to rectify and filter the first induced voltage portion in order to output the first DC voltage at said first output end thereof, and
    a second circuit portion that has said second input end and said second output end and that is configured to rectify and filter the second induced voltage portion in order to output the second DC voltage at said second output end thereof; and
  said converting unit further receives the second DC voltage from said second output end of said second circuit portion of said rectifier and filter circuit, and generates, based on the first DC voltage and further on the second DC voltage, the first and second DC output voltages, and a further third DC output voltage different from the first and second DC output voltages.

7. The multi-output DC-to-DC power converter of claim 6, wherein said converting unit permits the first and second DC voltages to be outputted respectively as the first and second DC output voltages, and said converting unit includes:
  a first regulator circuit coupled to said second output end of said second circuit portion of said rectifier and filter circuit for receiving the second DC voltage therefrom, said first regulator circuit being configured to convert the second DC voltage into the third DC output voltage based on a first control signal, and output the third DC output voltage;
  a first feedback circuit coupled to said first regulator circuit for receiving the third DC output voltage therefrom, and configured to generate a first feedback signal based on the third DC output voltage; and
  a first regulator control circuit coupled to said first regulator circuit and said first feedback circuit, said first regulator control circuit receiving the first feedback signal from said first feedback circuit, being configured to generate the first control signal based on the first feedback signal, and outputting the first control signal to said first regulator circuit.

8. The multi-output DC-to-DC power converter of claim 6, wherein said converting unit permits the first DC voltage to be outputted as the first DC output voltage, and includes:
  a first regulator circuit coupled to said second output end of said second circuit portion of said rectifier and filter circuit for receiving the second DC voltage therefrom, said first regulator circuit being configured to regulate the second DC voltage based on a first control signal to generate the second DC output voltage, and outputting the second DC output voltage;
  a first feedback circuit coupled to said first regulator circuit for receiving the second DC output voltage therefrom, and configured to generate a first feedback signal based on the second DC output voltage;
  a first regulator control circuit coupled to said first regulator circuit and said first feedback circuit, said first regulator control circuit receiving the first feedback signal from said first feedback circuit, being configured to generate the first control signal based on the first feedback signal, and outputting the first control signal to said first regulator circuit;
  a second regulator circuit coupled to said first regulator circuit for receiving the second DC output voltage therefrom, said second regulator circuit being configured to convert the second DC output voltage into the third DC output voltage based on a second control signal, and output the third DC output voltage;
  a second feedback circuit coupled to said second regulator circuit for receiving the third DC output voltage therefrom, and configured to generate a second feedback signal based on the third DC output voltage; and a second regulator control circuit coupled to said second regulator circuit and said second feedback circuit, said second regulator control circuit receiving the second feedback signal from said second feedback circuit, being configured to generate the second control signal based on the second feedback signal, and outputting the second control signal to said second regulator circuit.

9. The multi-output DC-to-DC power converter of claim 8, wherein said converting unit further generates a fourth DC output voltage different from the first to third DC output voltages based on the third DC output voltage, and further includes:
 a third regulator circuit coupled to said second regulator circuit for receiving the third DC output voltage therefrom, said third regulator circuit being configured to convert the third DC output voltage into the fourth DC output voltage based on a third control signal, and output the fourth DC output voltage;
 a third feedback circuit coupled to said third regulator circuit for receiving the fourth DC output voltage therefrom, and configured to generate a third feedback signal based on the fourth DC output voltage; and
 a third regulator control circuit coupled to said third regulator circuit and said third feedback circuit, said third regulator control circuit receiving the third feedback signal from said third feedback circuit, being configured to generate the third control signal based on the third feedback signal, and outputting the third control signal to said third regulator circuit.

10. The multi-output DC-to-DC power converter of claim 8, wherein said converting unit further generates a fourth DC output voltage different from the first to third DC output voltages based on the first DC output voltage, and further includes:
 a third regulator circuit coupled to said first output end of said first circuit portion of said rectifier and filter circuit for receiving the first DC voltage therefrom, said third regulator circuit being configured to convert the first DC voltage into the fourth DC output voltage based on a third control signal, and output the fourth DC output voltage;
 a third feedback circuit coupled to said third regulator circuit for receiving the fourth DC output voltage therefrom, and configured to generate a third feedback signal based on the fourth DC output voltage; and
 a third regulator control circuit coupled to said third regulator circuit and said third feedback circuit, said third regulator control circuit receiving the third feedback signal from said third feedback circuit, being configured to generate the third control signal based on the third feedback signal, and outputting the third control signal to said third regulator circuit.

11. The multi-output DC-to-DC power converter of claim 6, wherein:
 said first circuit portion of said rectifier and filter circuit includes
  a first diode having an anode that is coupled to said first input end, and a cathode,
  a first inductor coupled between said cathode of said first diode and said first output end,
  a second diode having a grounded anode, and a cathode that is coupled to said cathode of said first diode, and
  a first capacitor coupled between said first output end and ground;
 said second circuit portion of said rectifier and filter circuit includes
  a third diode having an anode that is coupled to said second input end, and a cathode,
  a second inductor coupled between said cathode of said third diode and said second output end,
  a fourth diode having a grounded anode, and a cathode that is coupled to said cathode of said third diode, and
  a second capacitor coupled between said second output end and ground; and
 said multi-output DC-to-DC power converter is a forward type power converter.

12. The multi-output DC-to-DC power converter of claim 6, wherein:
 said first circuit portion of said rectifier and filter circuit includes
  a first diode having an anode and a cathode that are coupled respectively to said first input end and said first output end, and
  a first capacitor coupled between said first output end and ground;
 said second circuit portion of said rectifier and filter circuit includes
  a second diode having an anode and a cathode that are coupled respectively to said second input end and said second output end, and
  a second capacitor coupled between said second output end and ground; and
 said multi-output DC-to-DC power converter is a flyback type power converter.

* * * * *